United States Patent [19]
Seitz

[11] Patent Number: 5,091,804
[45] Date of Patent: * Feb. 25, 1992

[54] FOLDABLE OUTSIDE REAR-VIEW MIRROR FOR VEHICLES

[75] Inventor: Edwin Seitz, Neuenbuch, Fed. Rep. of Germany

[73] Assignee: Hohe KG, Collenberg, Fed. Rep. of Germany

[*] Notice: The portion of the term of this patent subsequent to Sep. 18, 2007 has been disclaimed.

[21] Appl. No.: 547,220

[22] Filed: Jul. 3, 1990

Related U.S. Application Data

[62] Division of Ser. No. 286,143, Dec. 19, 1988, Pat. No. 4,957,265.

[30] Foreign Application Priority Data

Dec. 18, 1987 [DE] Fed. Rep. of Germany ... 8716720[U]
Nov. 15, 1988 [DE] Fed. Rep. of Germany ... 8814288[U]

[51] Int. Cl.⁵ .............................................. G02B 7/18
[52] U.S. Cl. .................................... 359/841; 248/549; 248/479; 248/900
[58] Field of Search ............... 250/604, 635; 248/549, 248/479, 900

[56] References Cited

U.S. PATENT DOCUMENTS

| | | | |
|---|---|---|---|
| 4,031,771 | 6/1977 | Daley et al. | 248/479 |
| 4,732,461 | 3/1988 | Mittlehauser | 248/549 |
| 4,840,475 | 6/1989 | Herzog et al. | 248/479 |
| 4,872,636 | 10/1989 | Mittlehauser et al. | 248/549 |
| 4,932,766 | 6/1990 | Harry | 248/479 |
| 4,951,912 | 8/1990 | Manzoni | 248/549 |
| 4,957,265 | 9/1990 | Seitz | 350/604 |

FOREIGN PATENT DOCUMENTS

| | | |
|---|---|---|
| 2436339 | 7/1974 | Fed. Rep. of Germany . |
| 7922313 | 8/1979 | Fed. Rep. of Germany . |
| 8000783 | 1/1980 | Fed. Rep. of Germany . |
| 3220893 | 6/1982 | Fed. Rep. of Germany . |
| 60-92132 | 5/1985 | Japan . |
| 60-116539 | 6/1985 | Japan . |
| 60-219137 | 11/1985 | Japan . |
| 60-1151 | 1/1986 | Japan . |

Primary Examiner—Bruce Y. Arnold
Assistant Examiner—J. P. Ryan
Attorney, Agent, or Firm—Fleit, Jacobson, Cohn, Price, Holman & Stern

[57] ABSTRACT

Disclosed is an outside rear-view mirror for a vehicle, having a mirror base and a mirror housing which is adapted to assume a normal position for use relative to said mirror base and to rock forwardly and rearwardly and which is coupled to said mirror base by a rocker. To reduce the danger of injuries particularly of fingers, caused by a back-swinging mirror housing between said mirror and said mirror base, at least one spreading spring is provided one end of which abuts said mirror housing and the other end of which abuts said mirror base, and which urges said housing to a fully backward tilted position relative to said mirror base.

7 Claims, 8 Drawing Sheets

FOLDABLE OUTSIDE REAR-VIEW MIRROR FOR VEHICLES

This is a divisional application of application Ser. No. 07/286,143, filed Dec. 19, 1988, now U.S. Pat. No. 4,957,265.

BACKGROUND OF THE INVENTION

1. Field of the Invention

The invention refers to an outside rear-view mirror for a vehicle, having a mirror base and a mirror housing which is adapted to assume a normal position for use and to tilt forwardly or rearwardly relative to the mirror base. The mirror housing is held to the mirror base by a rocker that is mounted to the mirror housing on one end and to the mirror base at the other end thereof.

2. Description of the Related Art

German Offenlegungsschrift 32 20 893 discloses a mirror housing which when tilted returns to its normal position under the action of a strong tension spring. A stop element is provided which is adapted to hold the tilted mirror housing in a rearward end position. When the mirror housing is manually disengaged from the stop element it snaps to its normal position thereby creating the risk of trapping fingers between the strong rim of the mirror housing and the mirror base.

German Utility Model specification 80 00 783 shows an outside rear-view mirror the mirror housing of which is held in a rearward end position by engagement of a pin in a detent. When such engagement is released, the mirror housing is returned to its normal position by a strong tension spring. Thereby, also a risk of injury of fingers by trapping is present.

The invention is related to the co-pending U.S. patent application Ser. No. 07/239,384, now U.S. Pat. No. 4,896,859.

SUMMARY OF THE INVENTION

It is therefore an object of the invention to reduce substantially the risk of injury by trapping fingers between the rim of a tilted and returning mirror housing and the mirror base.

According to the invention an outside rear-view mirror for a vehicle is provided which has a mirror base and a mirror housing. The mirror housing is adapted to assume a normal position for use and to tilt forwardly or rearwardly relative to the mirror base. The mirror housing is coupled to the mirror base by a rocker that is mounted to the mirror housing on one end and to the mirror base at the other end thereof. Means are provided for holding the mirror housing in abutment to the mirror base when the mirror housing assumes its normal position. At least one spreading spring is provided which urges the mirror housing into the forward or rearward end position thereof when the mirror housing is caused to tilt away from its normal position.

With the outside rear-view mirror according to the invention the mirror housing can be transferred from its forward or rearward end position into its normal position of use only against the force developed by the spreading spring. Thus, the risk that the fingers may be trapped between the returning mirror housing and the mirror base is substantially reduced.

According to a first embodiment of the invention the means for holding the mirror housing in abutment to the mirror base in a normal position of the mirror housing are realized by at least two locking elements each of which is caught in an individual trap and may be released therefrom upon impact in rearward and forward direction upon the mirror housing, respectively. In a more specific embodiment, a first trap is formed by two parallel spaced spring rods mounted to the mirror base. The associated locking element is then formed from the mirror housing as an arm having an undercut end section by which it may snap behind the spring rods when the mirror housing assumes its normal position. This allows rocking of the mirror housing away from the rocker. The second trap preferably is formed by an elastic nose gripping releasably over a rocker bar. As the gripping force of the nose is less than that of the spring rods the mirror housing may rock together with the rocker.

Preferably, the spreading spring is mounted around the rear rocking axis of the mirror housing which is formed by a rearward transverse bar of the rocker to which the mirror housing is pivotably mounted. Upon forward impact on the mirror housing it may rock freely forwardly about its front rocking axis. As long as a tension spring for returning the tilted mirror housing to its normal position is not provided for the afore mentioned risk of injury is avoided.

However, often it is desirable that a freely swinging movement of the tilted mirror housing is avoided. To this end a second embodiment of the invention is devised according to which the mirror housing is coupled to the mirror base by a strong tension spring holding the mirror housing in its normal position of use. Upon forward impact of the mirror housing it may rock forwardly from its normal position and is returned thereto by the tension spring. In a preferred embodiment one end of the tension spring is secured at the mirror housing and the other end thereof urges a locking element movably mounted to the rocker to a way formed on the mirror base along which the locking element travels when the mirror housing is rocking rearwardly. The way includes a trap for catching the locking element when the mirror housing assumes its normal position. Besides the trap the way includes an inclined largely circular surface which terminates in a recess. During the rearward rocking movement of the mirror housing, the locking elements rides along the way and when it falls into the recess, the mirror housing assumes its rearward end position.

Consequently, according to the second embodiment of the invention the force developed by the tension spring is transferred into a force which like the spreading spring according to the first embodiment of the invention urges the rearwardly rocking mirror housing towards its rearward end position. The risk of injuries is reduced also in the second embodiment of the invention in view of the fact that the mirror housing easily may be folded rearwardly towards the mirror base and that there is no need for intentionally folding the mirror housing forwardly. In a more specific realization of the second embodiment of the invention a lever is pivotably mounted to the rocker, one end of which is mounted to one end of the tension spring and the other end of which abuts the locking element. Such lever is the preferred means for transferring the amount and direction of the force developed by the tension spring into the desired spreading force.

According to still a further feature of the invention the mirror housing is slightly raised from the mirror base when it rocks rearwardly so that the coating of the mirror housing rim is not damaged by the rearward rocking movement of the mirror housing.

BRIEF DESCRIPTION OF THE DRAWING

The invention is described in detail hereinafter with reference to the embodiments as illustrated in the accompanying drawings which show.

DESCRIPTION OF THE PREFERRED EMBODIMENTS

Figure 1:
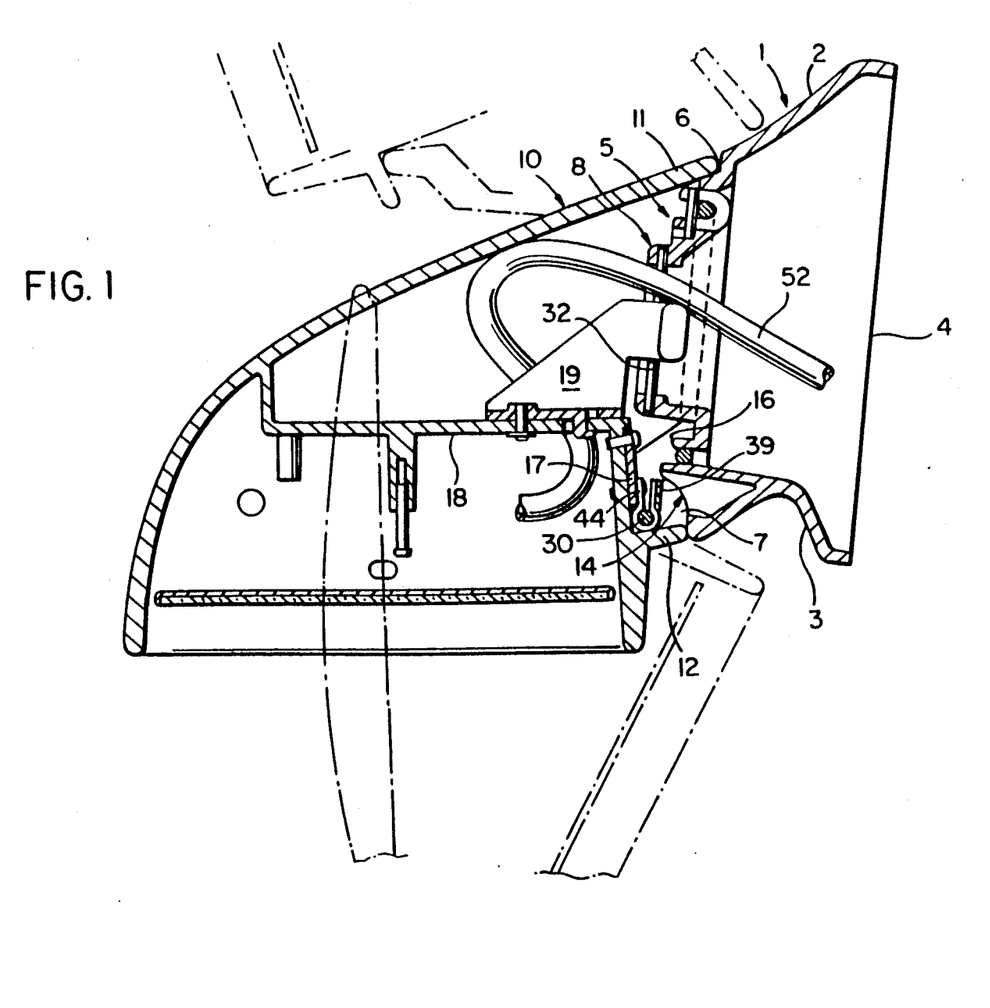
FIG. 1: a top view of a substantial horizontal cross section of an outside rear-view mirror, the mirror housing thereof being in the normal position for use, according to a first embodiment of the invention.

According to the first embodiment of the invention an outside rear-view mirror includes a hollow mirror base 1 which may be mounted by means not shown to the left driver's door of a vehicle, for example to the triangle in the front of the window. When being mounted to a car body the edge 4 of mirror base 1 abuts tightly the body of the vehicle. Opposite to the edge 4 the mirror base has a profiled mounting plate 5 extending substantially parallel to the edge 4 and being connected to the edge 4 by sloping walls 2, 3. A shoulder 6 stepped inwardly from mounting plate 5 surrounds the greater portion of the mounting plate 5 against which the thickened front (seen in travelling direction) rim 11 of the mirror housing 10 abuts when the mirror housing assumes its normal position. The rear rim 12 of the mirror housing 10 then abuts a rim section 7 of the mirror base 1. From the mounting plate 5 a medium raised portion 8 is formed which is surrounded by a rocker 20 when the mirror housing assumes its normal position. Portion 8 has a substantially rectangular opening 9 which is bridged by two parallel spaced sping rods 32, 34. The opposing ends of both spring rods 32, 34 are fixedly anchored in the opposing edges limiting opening 9 so that every spring rod is elastically yieldable transverse to its length. The rocker 20 is formed as a rigid frame having two spaced substantially parallel longitudinal webs 22, 24 and a front transverse bar 26 and a rearward transverse bar 28 each connecting longitudinal webs 22, 24. Elongated webs 22, 24 are extended rearwardly beyond transverse bar 28 and bent slightly outwardly to form web sections 27, 29 the free ends of which are connected by a shaft 30. Shaft 30 runs substantially parallel to transverse bar 28 which extends in an angle relative to front bar 26.

Front bar 26 is rotatably mounted in a groove 13 formed from the mounting plate between the front part of portion 8 and the stepped shoulder 6 thereof. A pair of spaced pins 25, 27' are gripping over crossed bar 26 and are anchored in the mounting plate on either side of groove 13. Thus, front bar 26 forms the forward rocking shaft about which the mirror housing may rock upon forward impact.

The rearward bar 28 of rocker 20 is releasably held within a rear groove 15 of the mounting plate 5 formed between portion 8 and a curved profile 14 thereof terminating in rim 7. When the mirror housing assumes its normal position rearward bar 28 is snapped behind a nose 16 in such a way that upon forward impact on the mirror housing bar 28 will be released from its gripping engagement with nose 16. Thus, nose 16 forms a locking element which assures that the mirror housing 10 together with the rocker 20 will firmly maintain its normal use position.

Figure 2:
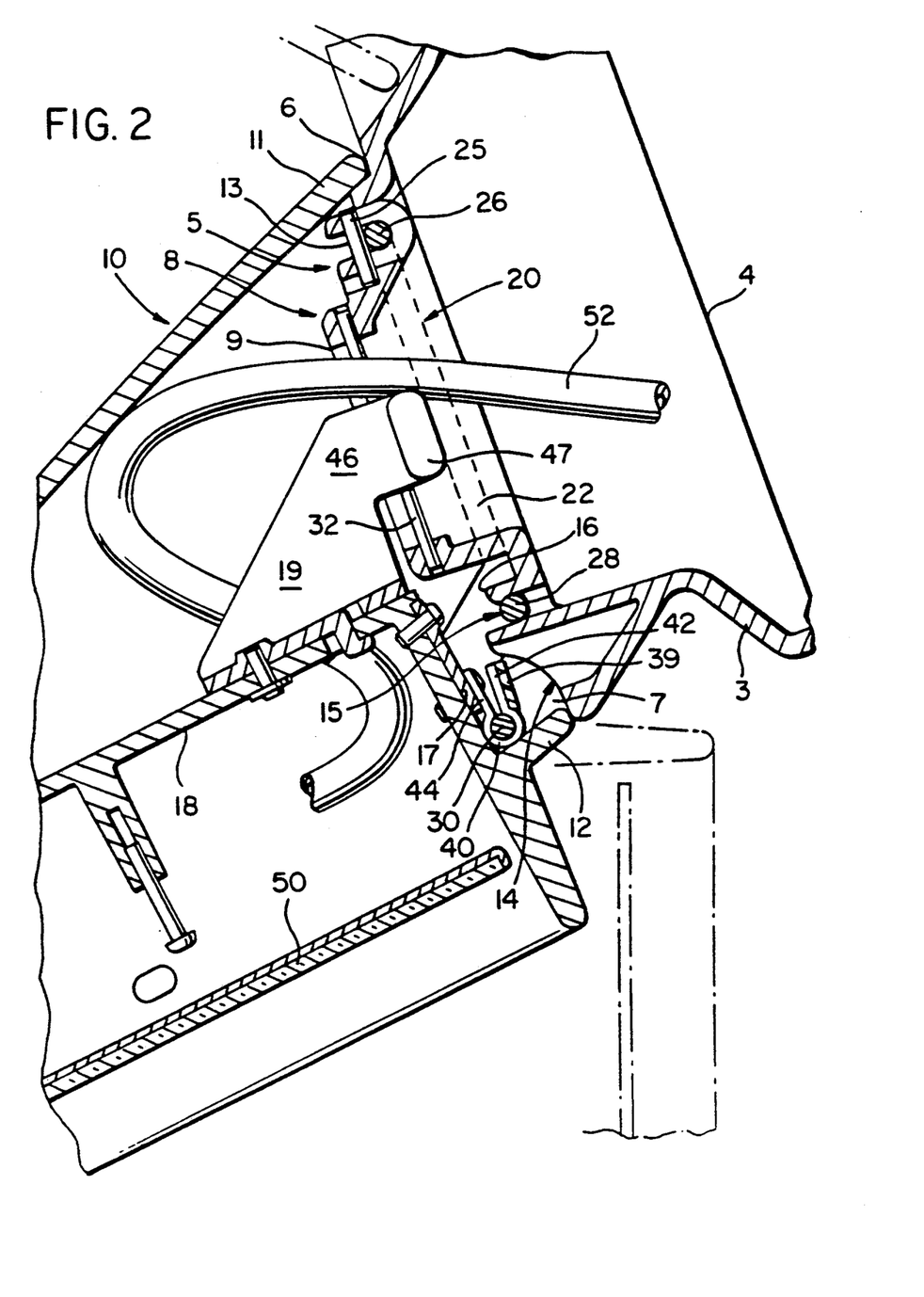
FIG. 2: a top view according to FIG. 1 on a portion of the mirror in an enlarged scale.
Figure 3:
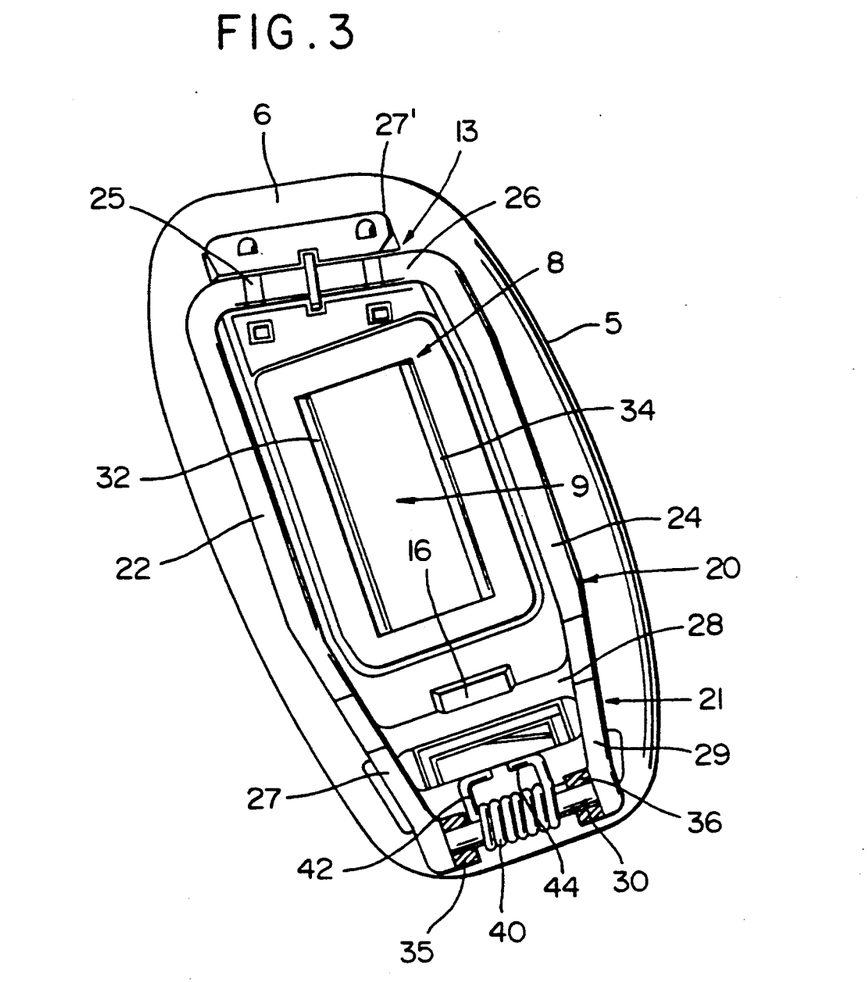
FIG. 3: a view on a portion of the mirror base with rocker after removal of the mirror housing according to the first embodiment of the invention.

On the other end shaft 30 forms the rearward rocking axis for the mirror housing which is rotabaly mounted to said shaft as indicated at 35, 36. In detail, two cars 35, 36 are formed from the mirror housing which are provided with aligned through bores for receiving shaft 30. As may be seen specifically from FIG. 3 a spreading spring 40 surrounds shaft 30 between ears 35, 36. One end 42 of the spreading springs 40 abuts a plate 39 of the mirror base whereas the other end 44 of spring 40 abuts a cheek 17 of the mirror housing 10 which is formed as an inner elongation of the lateral wall of the mirror housing proximate to the mirror base. As may be seen from FIG. 2 the rearward rim 12 of the mirror housing extends rearwardly to shaft 30 from said lateral wall of the mirror housing towards the mirror base for abutment to surface 7.

Figure 4:
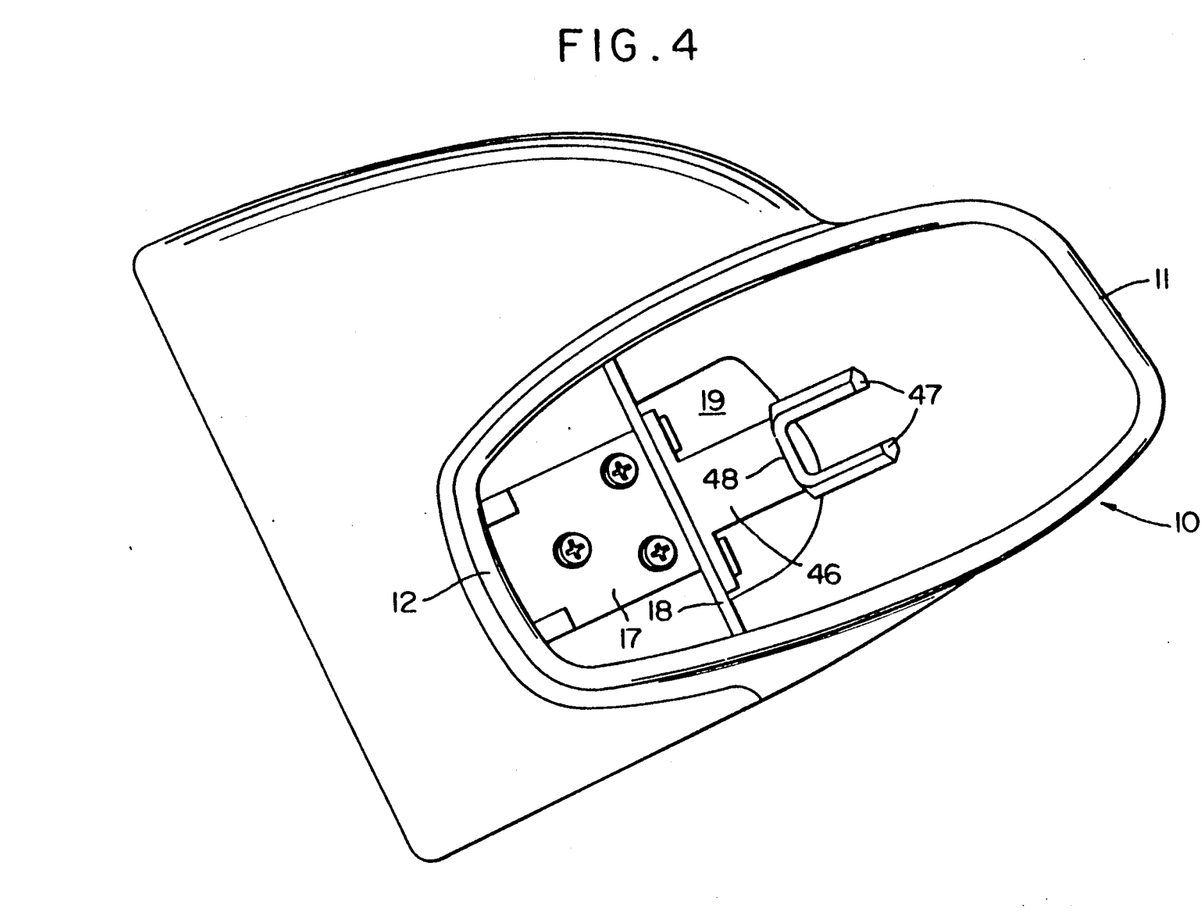
FIG. 4: a view into the opening of the mirror housing seen from the mirror base when the mirror housing assumes its normal position for use, according to the first embodiment of the invention.

Within the mirror housing 10 an intermediate bottom wall 18 is formed upon which a not shown device for holding a mirror glass 50 is mounted. The bottom wall 18 extends from said lateral wall proximate to the mirror base and connects to the inner surface of the bent outer wall of the mirror housing. Proximate to the mirror base a block 19 is mounted to the intermedial bottom wall 18 and extends in a direction away from the mirror glass 50. Block 19 is provided with an arm 46 which extends towards the mirror base when the mirror housing assumes its normal position, and then actually penetrates the opening 9 of portion 8. As it is shown in FIG. 4 the free end of arm 46 is formed as a fork 47 having an undercut 48 at its transition to arm 46. The thickness of the fork 47 is larger than the width between the related spring rods 32, 34 to such extent that the fork 47 may bend spring rod 32, 34 laterally outwardly when the mirror housing has returned to its normal position so that the sping rods 32, 34 snap into the undercut 48 behind the fork 47 when the mirror housing assumes its normal position. Thus, arm 46, undercut 48 and fork 47 form another locking element suitable to hold the mirror housing firmly in its normal position after it has been returned thereto from its rearward end position. The mounting position of block 19 is selected such that snapping of the spring rods 32, 34 behind fork 47 assures that rim portions 11, 12 of the mirror housing abut on shoulders 6 and 7, respectively in the normal position of the mirror housing.

Not specifically shown are the holder and adjusting mechanism of the mirror glass 50 of the outside rearview mirror which is mounted to the bottom wall 18 and permits in known manner a horizontal and vertical adjustment of the mirror glass 50 from the inside of the vehicle. The necessary control lines or cables may be enclosed by tube 52 which extends from said mechanisms through an opening in the bottom wall 18 and between the spring rods 32, 34 and the opening 9 through the mirror base into the vehicle.

The normal position for use of the mirror housing 10 relative to the mirror base 1 is thus determined by the snapping engagement of the spring rods 32, 34 gripping behind fork 47 into the undercut 48 and by the snapping engagement of nose 16 above bar 28. As may be seen from FIG. 2 in the normal position for use of the mirror housing 10 the mounting plate 5 is completely covered thereby. Upon a sufficient rearward impact on the mirror housing from the front side the fork 47 is disengaged from rods 32, 34 because bar 28 is arranged rearwardly to the fork 47. The mirror housing 10 then may swing rearwardly about shaft 30 and may assume its rearward end position under the influence of the force developed by the spreading spring 40. The rearward end position of the mirror housing 10 is determined by abutment of the rearward rim 12 against the backside of plate 39 or a different stopping element of the mirror base. The mirror housing maintains its rearward end position until it is returned by hand against the force of the spreading spring 40 into its normal position for use. It is to be noted, that rocker 20 is safely maintained at the mirror base 1 during rearward rocking movement of the mirror housing because transverse bar 26 remains held within groove 13 by locking pins 25, 27'.

On the other hand, upon a sufficient forward impact on the mirror housing from the rear side fork 47 is not disengaged from rods 32, 34, instead the rearward transverse bar 48 is released from the snapping engagement with nose 16. Thus, the mirror housing 10 may rock forwardly together with rocker 20 about the forward rocking axis 26. Such slaving of the rocker 20 with the forwardly rocking mirror housing 10 is possible because the gripping force developed by the spring rods 32, 34 with respect to fork 47 is substantially greater than the gripping force of nose 16 with respect to transverse bar 28. The mirror housing 10 may be returned by hand from any forwardly rocked position thereof into its normal position for use when transverse bar 28 snaps behind nose 16.

The second embodiment of the invention is specifically illustrated in FIGS. 5-9 and is described hereinafter. It may be seen that the shown outside rear-view mirror is adapted to be mounted to the right front door of a car. Thus, the driving direction of the car in said figures points from the right to the left side.

The outside rear-view mirror according to FIGS. 5-9 includes a mirror base 101 and a mirror housing 102. The mirror base 101 is provided with internally threaded mounting studs 103, 104 extending away from a mounting plate 105 of the mirror base 101 towards the not shown car body and allowing attachment of the outside rear-view mirror to the car door. The mirror housing 102 formed from hard plastic, in its normal position for use, abuts the lateral rim of the mounting plate 105 by a front rim portion 107 and a rearward rim portion 109. A strong tension spring is provided for retaining the mirror housing 102 to the mirror base 101. One end of the tension spring 110 is anchored within the mirror housing 102 in a not shown manner whereas the end of tension spring 110 proximate to the mirror base 101 is suspended to a lever 116 which is rockably mounted in a rocker 120. Clearly, the tension spring 110 extends through an opening provided for in a lateral separating wall of the mirror housing.

Figure 5:
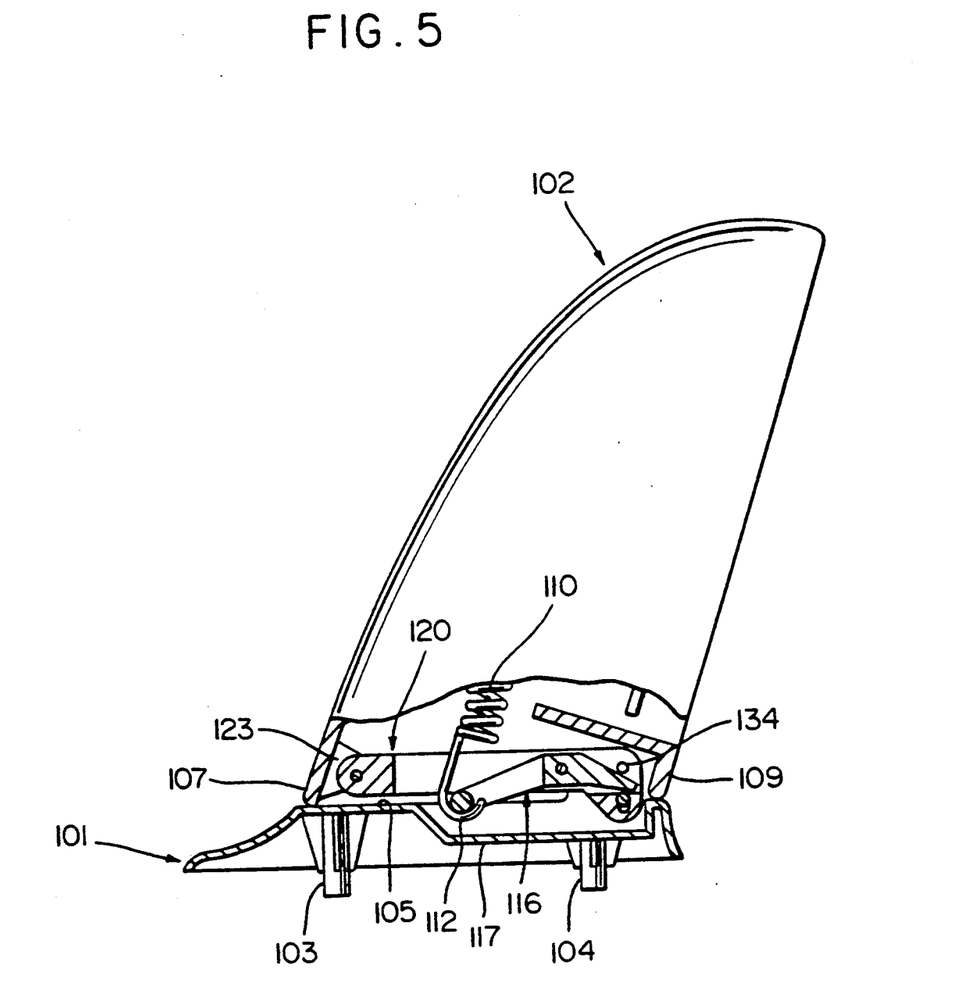
FIG. 5: a top view on an outside rear-view mirror according to a second embodiment of the invention wherein the mirror base and the portion of the mirror housing proximate to the mirror base are shown in a cross section, the mirror housing assuming its normal position for use.

The mirror housing 102 is coupled to the mirror base 101 by a rocker 120 which is mounted rotatably at its forward end to spaced ears 121, 123 formed internally from the mirror housing by an elongated pin 127 which extends through aligned bores within the ears 121, 123 and the forward end 125 of the rocker 120. Pin 127 thus defines the forward rocking axis of the mirror housing 102 relative to the mirror base 101.

Figure 9:
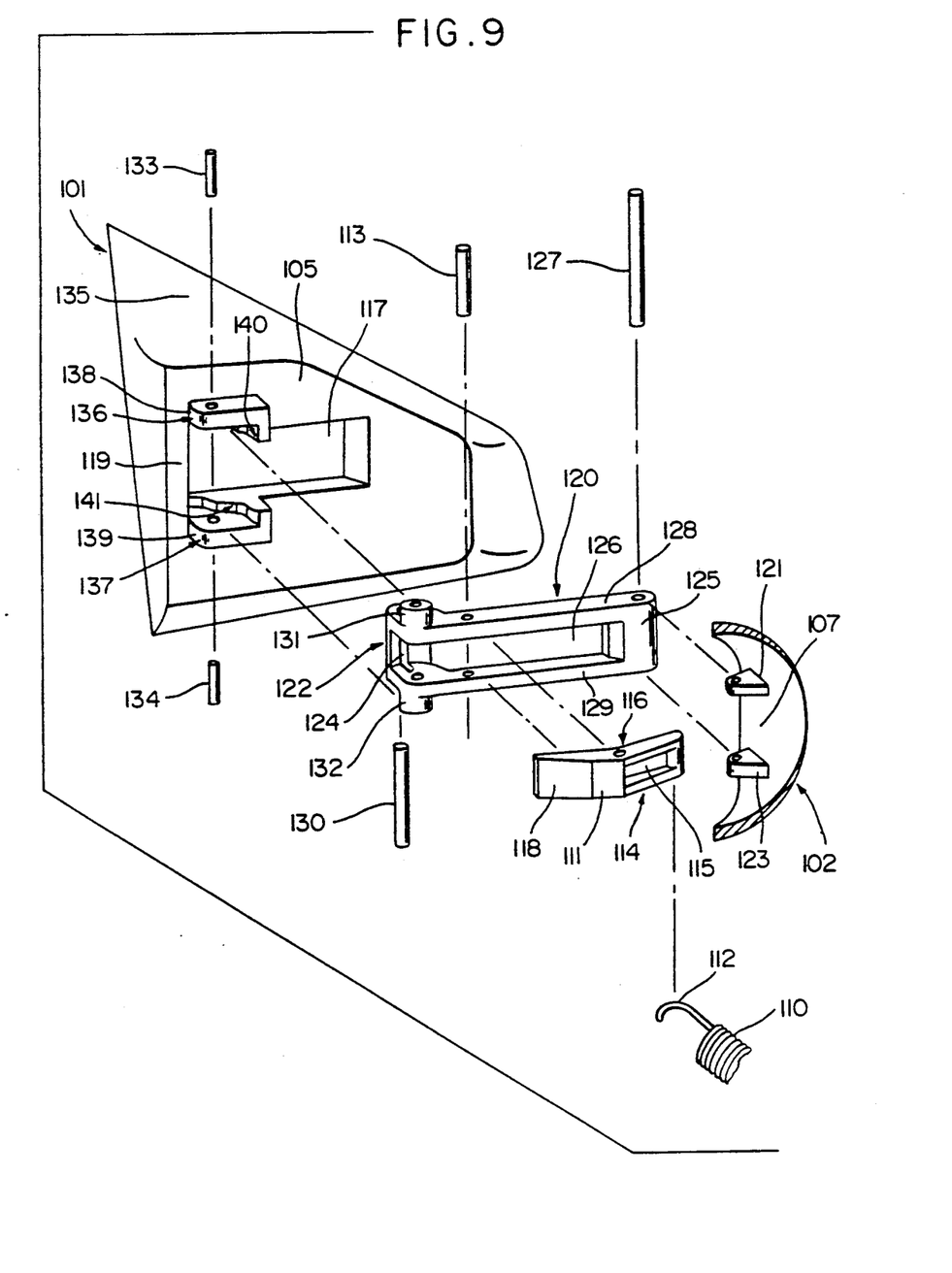
FIG. 9: an exploded view to explain the kind of assembling the rocker and the accompanying parts of the outside rear-view mirror according to FIG. 5.

Rearwardly, the rocker 120 is rotatably mounted to the mirror base 101 by a pair of second pins 133, 134 which are inserted into aligned holes provided in spaced opposing projections 136, 137 of the mirror base 101 and in aligned blind holes provided for in a rearward portion of the rocker 120.

The rocker 120 is formed by two opposing strong webs 128, 129 extending parallel to each other and each having a rearward transverse extension directed to the mirror base 101. Both webs 128, 129 are connected at the front end by a transverse member 125 and at the lateral rearward end by a corresponding transverse member 122. Thus, the rocker has a form of an L with a comparatively short basis when seen from the top. Moreover, between webs 128, 129 a longitudinal slot 126 remains free for use to be described. At a position where the long side of the L and the short basis thereof meet, each web is provided with upwardly and downwardly projecting bushings 131, 132. Each bushing and the related web portion have aligned blind bores for receiving pins 133, 134, respectively. Thus, pins 133, 134 define the rearward rocking axis of the mirror housing.

Into the base portion of each web 128, 129 a longitudinal slot 124 is cut for receiving movably a locking element in form of an elongated pin 130. Remarkably, the length of the pin 130 is greater than the distance of webs 128, 129 so that both opposing ends of pin 130 project above and below webs 128, 129.

A lever 116 is held rotatably within slot 126 by a pin 113 extending through aligned bores in webs 128 and 129 and in an intermediate portion 111 of lever 116. Lever 116 is mounted within the slot 126 in a position between bushings 131, 132 and the forward bar 125 of the rocker 120. The lever 116 is provided with a forward opening 115 in the forward arm thereof so that end 112 of tension spring 110 may be hung into the forward arm 114 of lever 116. The rearward arm 118 of lever 116 is provided with a plane abutment surface adapted to abut an intermediate portion of pin 130 when being caught within slot 124.

Figure 7:
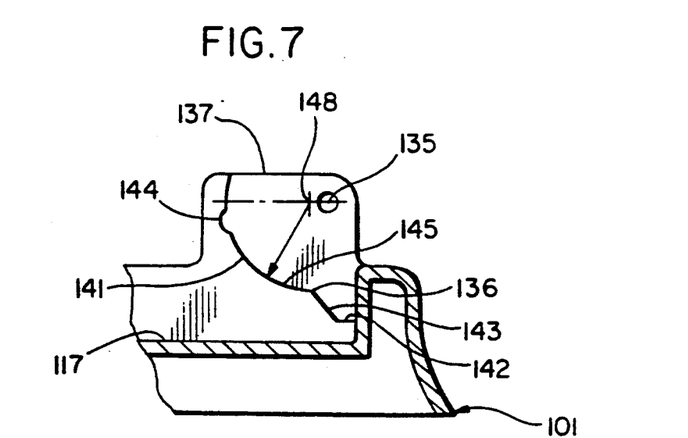
FIG. 7: a view of a section of the mirror base in an enlarged scale for illustrating the way along which a locking element may travel.

The opposing projections 137, 138 of the mounting plate 105 are vertically spaced in a distance so that rocker 120 with bushings 131, 132 fits rotatably therebetween when being held by inserted pins 133 and 134. As both projections 136, 137 are of similar form only the foot projection 137 as specifically shown in FIG. 7 is described in detail here below.

Foot 137 has a base upon which bushing 132 is standing, and has a way 141 of largely circular form surrounding inwardly and forwardly said base. On said base the lower end of pin 130 rides in engagement with the way 141 as it is urged thereto by the rearward portion 118 of lever 116 under the influence of spring 110. The way 141 formed as a surface upright with respect to the base includes four sections. The first section is a trap 142 adjoining an inward wall of a recess 117 formed in mounting plate 105. From trap 142 a rim 143 raises to a threshold 136 which adjoins a circular portion 145 of way 141 terminating to a small recess 144. The center 148 of curvature of the circular section 145 of way 141 is offset forwardly with respect to the center of bore 135 receiving pin 134. Such offset results in an increasing distance of section 145 to the center of bore 135 which ensures that the locking pin 130 may run along section 145 under the influence of spring 110 when having surmounted threshold 136.

It is to be understood that projection 136 is formed with a similar way 140 having identical sections as those mentioned before for way 141. Thus, during normal position of use of the mirror housing the rocking pin 130 is caught within the trap 142. Upon an impact of sufficient magnitude which drives the locking pin 130 over threshold 136 the mirror housing may rock rearwardly when the locking pin 130 travels along way section 145. The travel of the locking pin 130 is terminated by its being trapped within recess 144 at the end of section 145. Thereby the rearward end position of the mirror housing is defined.

Figure 8:
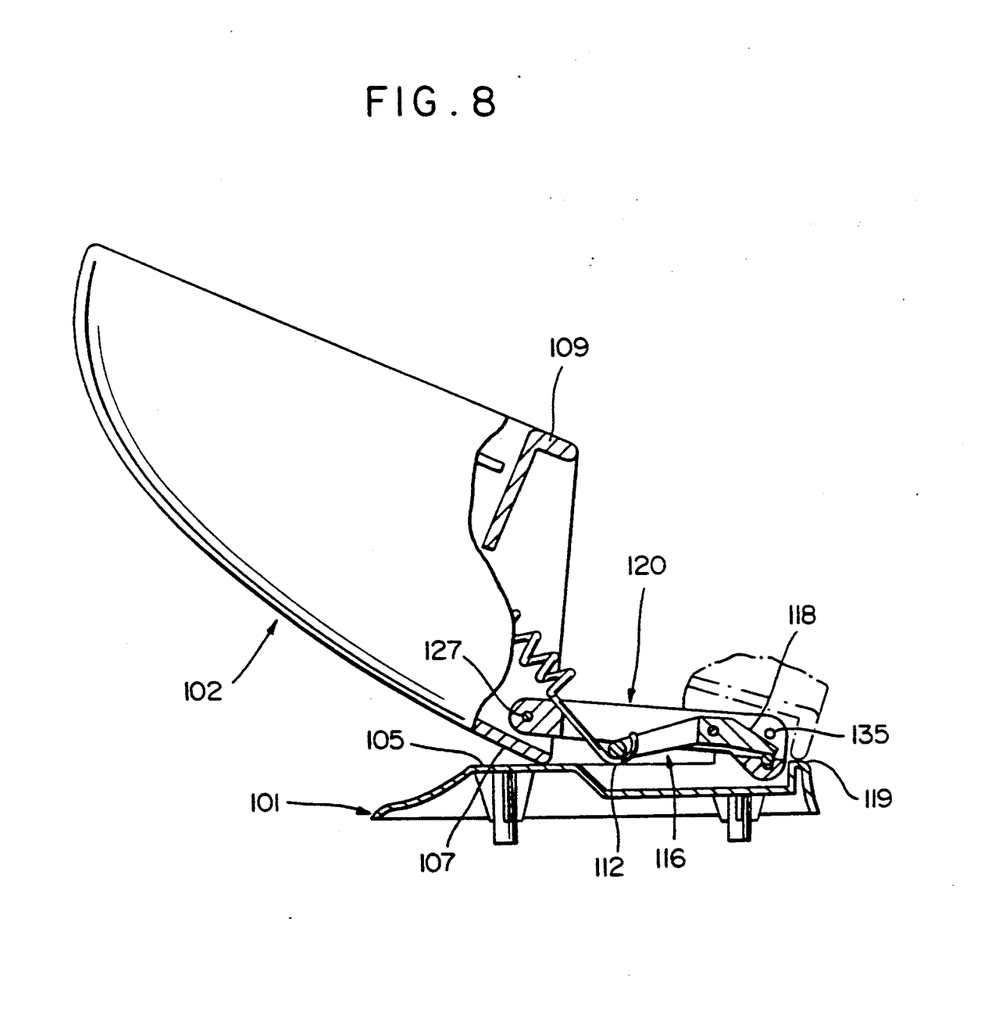
FIG. 8: a view similar to FIG. 5 wherein the mirror housing is rocked forwardly.

On an impact to the mirror housing 102 in normal position for use (FIG. 5), that is directed forewardly, it rocks around its front rocking axis 127 and is temporary in a position relative to the mirror base 101, as shown in FIG. 8. The tension spring 110, suspended in the front arm 114, applies a drawing force onto the mirror housing towards the normal position that ensures the mirror housing to return to this normal position, as soon as the forwardly directed external force diminishes because rocker 120 cannot swing forwardly from mirror base 101.

Figure 6:
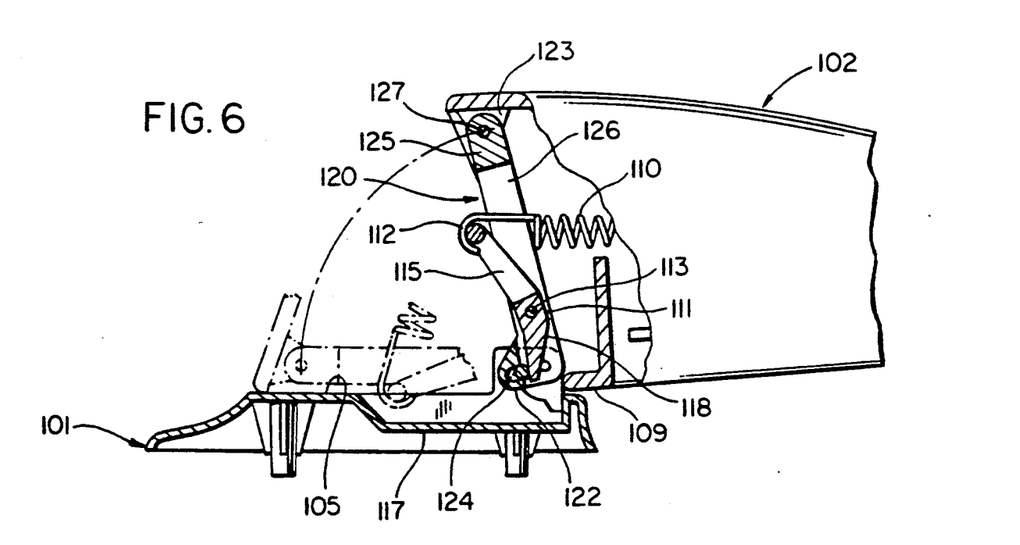
FIG. 6: a view similar to FIG. 5 wherein the mirror housing is shown in the rearward end position.

In case of an impact or a force, applied intentional by hand onto the mirror housing that is directed backwardly, being sufficient to disengage the locking element 130 from the trap 142 and to move it over the threshold 136, the mirror housing 102, together with the rocker arm 120, tilts backwardly around the rear rocking axis defined by pins 133, 134. Tilting continues, even when the influence of the backward directed force is stopped. The force of the tension spring 110 onto the locking element 130, creates, due to the particular shape of the way section 145 and the lever 116, a component that drives the locking element 130 along the way from the threshold 146 towards the recess 144. Thereby, the locking element 130 moves within the slot 124 away from the rocking axis 135. As soon as the locking element 130 is caught in the recess 144, the mirror housing assumes its fully backward tilted position, as shown in FIG. 6. From this fully backward tilted position of the mirror housing 102, it is possible to move it under the influence of a forwardly directed force to the normal position of use, whereby the locking element 130 slides out of the recess 144, over the way section 145 and the threshold 146 into the trap 142.

It has to be mentioned, that the rear rim 109 of the mirror housing 102, lying tight to the shoulder 119 of the mounting plate 105 in normal position for use, is lifted away from the shoulder 119 during the rearward rocking movement of the mirror housing. This is achieved essentially by the fact, that the rear rim 109 at beginning of the rearward rocking movement abuts rear surfaces 138, 139 of the projections 136, 137 and thus turns slightly around the front rocking axis 127 under an ongoing rearward rocking movement of the mirror housing 102, as shown in FIG. 6. This is caused by arranging pins 133, 134 outwardly and forwardly with respect to shoulder 119.

By choice of the ratio of the effective length of the arms 114, 118 of the lever 116, the force applied by the tension spring 110 onto the locking element 130 may be adjusted to the actual situation.

The invention is not restricted to details of the embodiments as described herein. The invention is applicable for outside rear-view mirrors having a mirror glass that is adjusted from outside, as well as for outside rear-view mirrors containing electrical or mechanical means for the adjustment of the mirror glass that extend through an opening of the mirror housing through the mirror base into the inside of the vehicle.

What is claimed is:

1. An outside rear-view mirror for a vehicle, said mirror comprising:
   a mirror base,
   a mirror housing adapted to assume a normal position for use and to rock forwardly and rearwardly relative to said mirror base,
   a rocker, said mirror housing being coupled to said mirror base by said rocker, said rocker having one end mounted rotatably to the mirror base and having an opposite end mounted rotatably to said mirror housing,
   spreading means for urging said mirror housing to a fully rearward tilted position relative to said mirror base when said mirror housing is moved rearwardly from its normal position,
   said spreading means including a tension spring, one end of said tension spring being anchored to said mirror housing and the other end forcing a locking pin against a way for travelling of said locking pin along said way when said mirror housing rocks rearwardly, said locking pin remaining caught in a trap of said way when said mirror housing rocks forwardly,
   said way including a threshold joining said trap and a circular portion extending beyond said threshold and terminating in a recess which, when receiving said locking pin, causes the mirror housing to assume a rearward rocking end position relative to the mirror base.

2. An outside rear-view mirror according to claim 1, wherein said tension spring is coupled to a lever pivotably mounted to the rocker and engaging said locking pin.

3. An outside rear-view mirror according to claim 2, wherein said lever has two opposite arms to one of which said tension spring is coupled and the other of which abutting said locking pin, and wherein the length of both arms are selected such that the force developed by said tension spring is transferred to a spreading force causing the mirror housing to assume its rearward rocking end position when it is released from its normal position of use.

4. An outside rear-view mirror according to claim 2, wherein the lever is mounted to said rocker intermediate the forward and rearward end thereof.

5. An outside rear-view mirror according to claim 1, wherein the center of curvature of the circular way section lies ahead a shaft forming the rearward rocking axis of said mirror housing.

6. An outside rear-view mirror according to claim 5, wherein said shaft is arranged outside a shoulder formed in said mirror base against which a rim section of said mirror housing abuts in the normal position for use thereof, for lifting said mirror housing slightly from said mirror base when said mirror housing rocks rearwardly.

7. An outside rear-view mirror for a vehicle, said mirror comprising:

a mirror base, a mirror housing having a normal position for use and being movable from the normal position for use to rock forwardly and rearwardly relative to said mirror base depending upon a direction of impact on said mirror housing and remaining in the forward or rearward position relative to the normal use position until the mirror housing is manually returned to the normal use position, said mirror housing being coupled to said mirror base by a rocker, said rocker having one end mounted rotatably to the mirror base and having an opposite end mounted rotatably to said mirror housing, spreading means for biasing said mirror housing to a fully rearward tilted position relative to said mirror base when said mirror housing is caused to tilt rearwardly from its normal position for use, said spreading means including a tension spring having one end coupled to said mirror housing and the other end forcing a locking pin against a way for travelling along said way when said mirror housing rocks rearwardly, said locking pin remaining caught in a trap for allowing the rocker to move with said mirror housing when said mirror housing rocks forwardly.

* * * * *